United States Patent [19]
Tado et al.

[11] Patent Number: 5,060,157
[45] Date of Patent: Oct. 22, 1991

[54] SHOCK ABSORBER CONTROL APPARATUS

[75] Inventors: Masahiro Tado; Hiroshi Satoh; Noriyuki Inoue; Yoshihiko Utsui, all of Amagasaki; Shunichi Wada, Himeji, all of Japan

[73] Assignee: Mitsubishi Denki K.K., Tokyo, Japan

[21] Appl. No.: 507,323

[22] Filed: Apr. 10, 1990

[30] Foreign Application Priority Data

Apr. 13, 1989 [JP] Japan ................................ 1-93742

[51] Int. Cl.$^5$ ............................................. B60G 17/00
[52] U.S. Cl. ................................ 364/424.05; 280/707; 280/840
[58] Field of Search ........... 364/424.1, 424.01, 424.05, 364/426.04; 180/170; 280/707, 840, 6.1

[56] References Cited

U.S. PATENT DOCUMENTS

| | | | |
|---|---|---|---|
| 4,809,175 | 2/1989 | Hosaka et al. | 364/426.04 |
| 4,825,367 | 4/1989 | Nagaoka et al. | 364/424.05 |
| 4,827,416 | 5/1989 | Kawagoe | 364/424.05 |
| 4,841,815 | 6/1989 | Takahashi | 364/424.1 |
| 4,842,342 | 6/1989 | Takahashi et al. | 364/424.01 |
| 4,853,860 | 8/1989 | Achenback | 364/424.05 |
| 4,886,291 | 12/1989 | Okamoto | 364/424.05 |
| 4,888,696 | 12/1989 | Akatsu et al. | 364/424.05 |
| 4,930,084 | 5/1990 | Hosaka et al. | 180/170 |

FOREIGN PATENT DOCUMENTS 60-47709 3/1985 Japan.
62-23805 1/1987 Japan.
63-90412 4/1988 Japan.

Primary Examiner—Gary Chin
Attorney, Agent, or Firm—Sughrue, Mion, Zinn Macpeak & Seas

[57] ABSTRACT

A shock absorber control apparatus which performs a fuzzy inference by use of a predetermined fuzzy rule regarding comfortable ride, steering stability and grounding efficiency corresponding to a detected running condition of a vehicle, thereby setting an optimum damping force. A shock absorber control apparatus which fetches a plurality of specified frequency components from a vertical acceleration signal of a vehicle body so as to perform a fuzzy inference by use of a fuzzy rule corresponding to a quantity of each frequency component, thereby setting an optimum damping force.

16 Claims, 7 Drawing Sheets (RULE 1)

(RULE 2)

(RULE 3)

(RULE 4)

(RULE 5)

Fig. 14(a) (RULE 1)
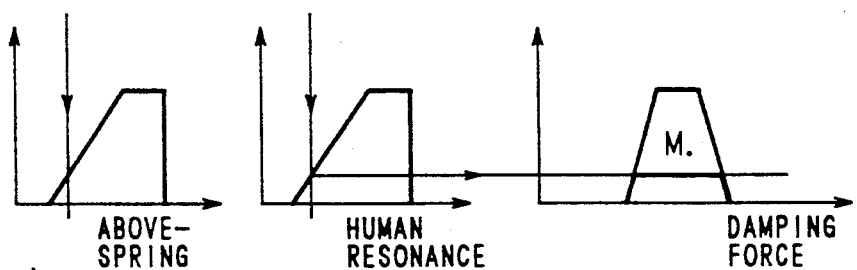
Fig. 14(b) (RULE 2)
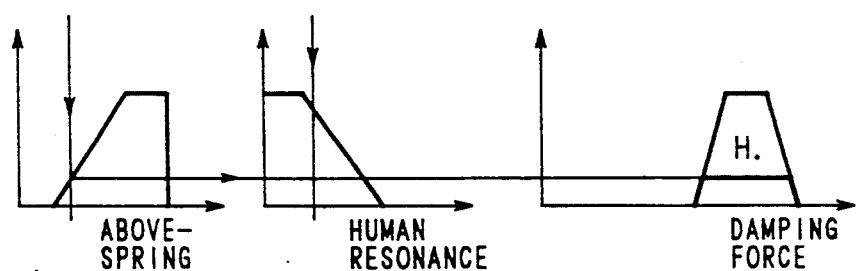
Fig. 14(c) (RULE 3)
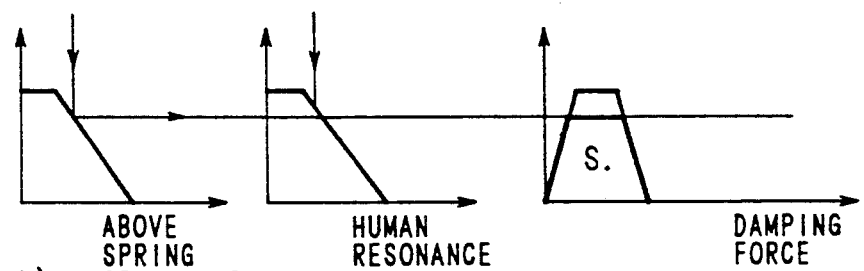
Fig. 14(d) (RULE 4)
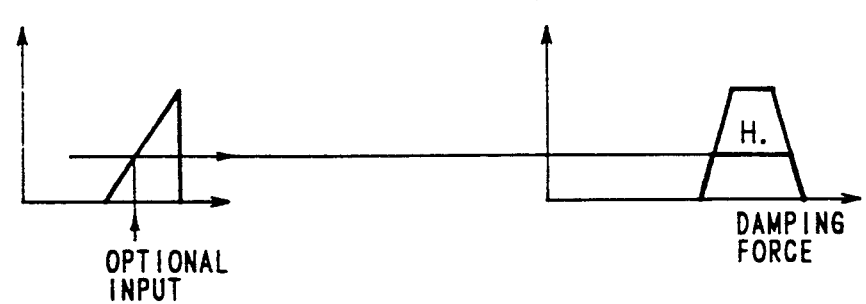
Fig. 14(e)
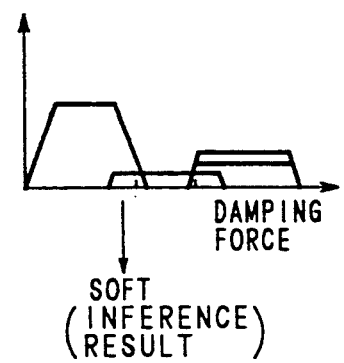

SHOCK ABSORBER CONTROL APPARATUS

BACKGROUND OF THE INVENTION

1. Field of the Invention

The present invention relates to a shock absorber control apparatus for controlling a damping force of a shock absorber provided between a body and each wheel of a vehicle.

2. Description of Related Art

An apparatus has been developed which controls the damping force of a shock absorber provided between the body and the wheel at a vehicle corresponding to a running condition thereof, such as the vehicle posture or the road surface condition. Regarding the vehicle posture, a control apparatus is proposed which sets the damping force of shock absorber HARD when, for example, the vehicle quickly starts, quickly brakes, and slaloms, thereby restricting generation of squatting, diving or rolling. Also, regarding the road surface condition, when the vehicle runs on a good road surface, the damping force of shock absorber is set SOFT so as to expect an improved comfortable ride. On the other hand, when running on a bad road, the damping force is set MEDIUM to expect an improved grounding efficiency.

In the conventional control method, by judging a vague and confronting evaluation factor, such as the comfortable ride or steering stability, with a constant threshold value, the damping force of shock absorber is set. As a result, priority of any evaluation factor needs to be decided, which is inefficient. Also, there is no apparatus which finely distinguishes the surface condition of a road in which the vehicle is driven so as to adjust the damping force of shock absorber.

Furthermore, when all the detected values in the running condition of the vehicle are less than a predetermined value, it is required to quickly restore them to the damping force in the specified region, which is not considered to be added as one of the control rules.

SUMMARY OF THE INVENTION

In order to solve the above-mentioned problem, the present invention has been designed.

A main object of the present invention is to provide a shock absorber control apparatus which can finely control a damping force.

Another object of the present invention is to provide a shock absorber control apparatus which can be smoothly restore to the specified damping force when control is not required.

Still another object of the present invention is to provide a shock absorber control apparatus which can accurately decide condition of the road surface and accurately control the damping force.

The shock absorber control apparatus of the present invention has a sensor for detecting the vehicle's running condition, a fuzzy inference unit for using the fuzzy rules as to a predetermined comfortable ride, steering stability, and grounding efficiency to perform the fuzzy inference on the basis of the detected running condition to thereby decide the damping force, and a control unit for controlling the damping force of a shock absorber corresponding to an output of the fuzzy inference unit. When all the detected values in the vehicle's running condition are not more than the predetermined value, the fuzzy inference unit infers the damping force so that the shock absorber restores to the specified damping force.

A modified embodiment of the shock absorber control apparatus of the invention has an acceleration sensor for detecting vertical acceleration of the vehicle body, a plurality of filters each passing a specified frequency component of an output of the acceleration sensor, a fuzzy inference unit for deciding the damping force by the fuzzy inference on the basis of the output of the respective filters, and a control unit for controlling the damping force of shock absorber corresponding to the output of fuzzy inference unit. The frequency components corresponding to the resonance state above spring (1 to 2 Hz), the human resonance state (around 4 Hz), and the resonance state below spring (10 to 20 Hz) are taken as the specified frequency components. Also, an input unit for giving a changeable selecting signal to the fuzzy inference unit is so provided that the fuzzy inference unit decides a desired damping force of a driver.

The above and further objects and features of the invention will more fully be apparent from the following detailed description with accompanying drawings.

BRIEF DESCRIPTION OF THE DRAWINGS

FIGS. 14(a)-14(d) illustrate modes of inference according to the fuzzy rules, and, FIG. 14(e) illustrates the results of fuzzy inference.

DESCRIPTION OF THE PREFERRED EMBODIMENTS

Figure 1:
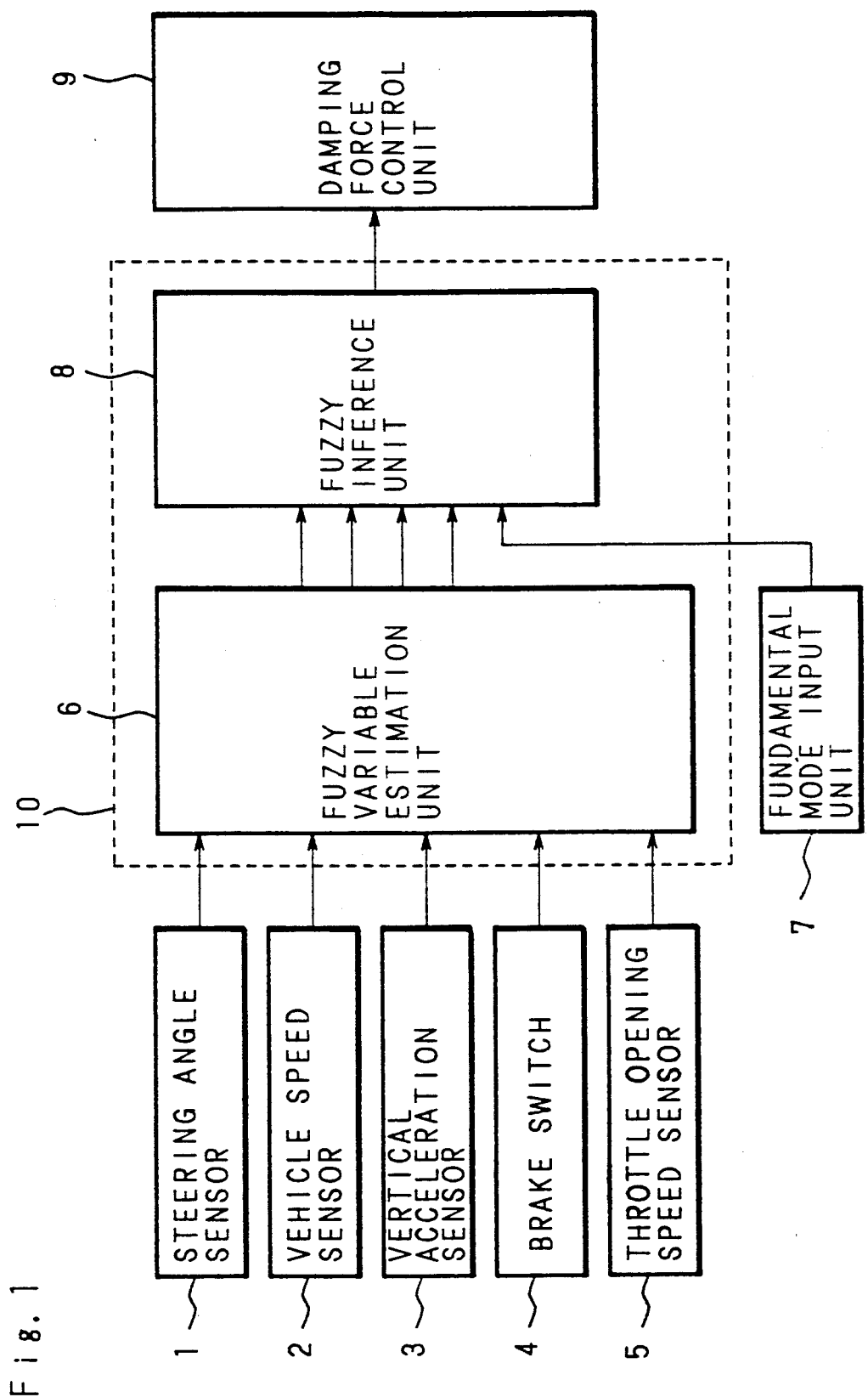
FIG. 1 is a block diagram of a shock absorber control apparatus of the present invention.

Referring to FIG. 1, reference numerals 1 to 5 designate various sensors of detecting means for detecting the running condition of a vehicle, the detecting means comprising a steering angle sensor 1 for detecting a steering angle of the vehicle, a vehicle speed sensor 2 for detecting the vehicle speed, a vertical acceleration sensor 3 for detecting the vertical acceleration of the vehicle, a brake switch 4 for detecting the braking action has been carried out, and a throttle opening speed sensor 5 for detecting the opening speed of a throttle. A controller 10 comprises a fuzzy variable estimation unit 6 for inputting therein the outputs of the steering angle sensor 1, vehicle speed sensor 2, vertical acceleration sensor 3, brake switch 4 and throttle opening speed sensor 5 so as to estimate values of fuzzy variables, and a fuzzy inference unit 8 for deciding the damping force by the fuzzy inference using the fuzzy rules from the value of fuzzy variable and an output signal of a fundamental mode input unit 7. The result of inference by the fuzzy inference unit 8 is outputted to a damping force control unit 9, so that the attenuation control unit 9 switches the damping force corresponding to the output.

Next, explanation will be given on operation of the shock absorber control apparatus of the invention. The fuzzy variable estimation unit 6 computes the fundamental frequency and amplitude of an output waveform from the vertical acceleration sensor 3 by means of a programmed data processing unit (not shown), thereby estimating the values of the fuzzy variable called the vertical acceleration frequency and vertical acceleration strength. Also, the fuzzy variable estimation unit 6 estimates the roll acceleration from the outputs of steering angle sensor 1 and vehicle speed sensor 2 and treats the estimated values as the fuzzy variable called the roll acceleration. Furthermore, the fuzzy variable estimation unit 6 estimates longitudinal acceleration from the outputs of brake switch 4 and throttle opening speed sensor 5, the estimated value being treated as the fuzzy variable called the longitudinal acceleration.

When the value of each fuzzy variable and that of each output of the steering angle sensor 1, vehicle speed sensor 2, vertical acceleration sensor 3, brake switch 4 and throttle opening speed sensor 5 are equal to the predetermined values or less, the output of the fuzzy variable estimation unit 6 is of not-input mode with respect to the fuzzy inference unit 8. Accordingly, in such case, only a signal for setting the damping force of shock absorber to be basically set, is outputted from the fundamental mode input unit 7 to the fuzzy inference unit 8, thereby deciding the damping force in the fundamental mode by the fuzzy inference.

The fuzzy inference is performed in accordance with the following fuzzy rules: In the rule 1, when the fundamental frequency of the output waveform from sensor 3 is equal to the above-spring resonance frequency 1 to 2 Hz and its amplitude is larger than the predetermined value, the damping force is set HARD. In the rule 2, when the fundamental frequency below-spring resonance frequency 10 to 15 Hz and its amplitude is larger than the predetermined value, the damping force is set MEDIUM. In the rule 3, when the roll acceleration is larger than the predetermined value, the damping force is set HARD. In the rule 4, when the longitudinal acceleration is larger than the predetermined value, the damping force is set HARD. In the rule 5, when any fuzzy variable value estimated by the output of the steering angle sensor 1, vehicle speed sensor 2, vertical acceleration sensor 3, brake switch 4 or throttle opening speed sensor 5 is equal to the predetermined value or less, the damping force is set in the fundamental mode (SOFT or MEDIUM) selected by the fundamental input unit 7. Furthermore, when the road surface is graveled, the road condition is decided by the below-spring resonance, so that when the amplitude of below-spring resonance exceeds a threshold value and continues over the predetermined time, the not-fuzzy rule is used to stop the damping force at MEDIUM.

Figure 2:
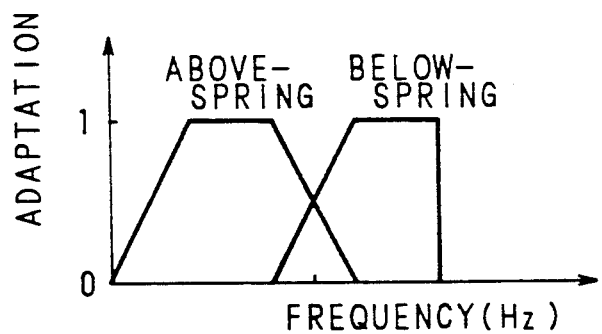
FIG. 2 is a graph of membership functions regarding the frequency of vertical acceleration.
Figure 3:
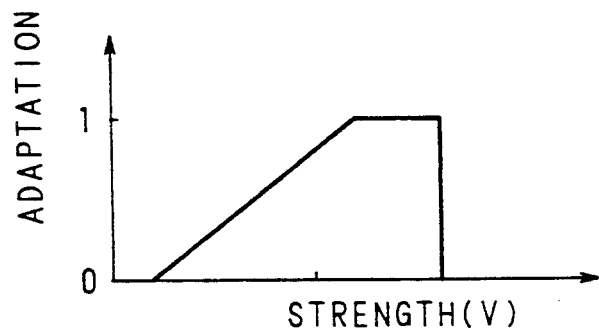
FIG. 3 is a graph of a membership function regarding amplitude of the vertical acceleration, strength of roll acceleration, and strength of longitudinal acceleration.
Figure 4:
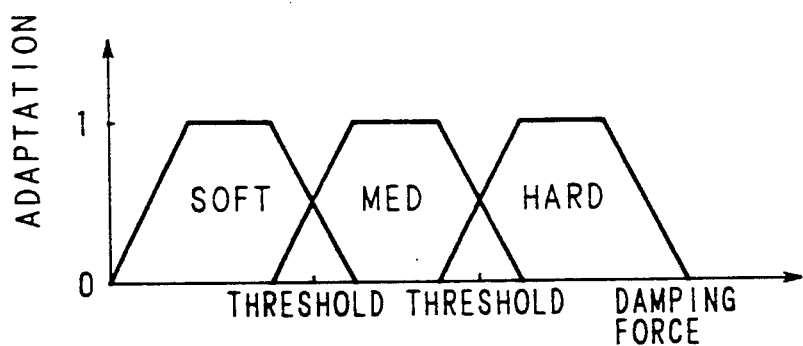
FIG. 4 is a graph showing membership functions regarding a damping force.
Figure 5:
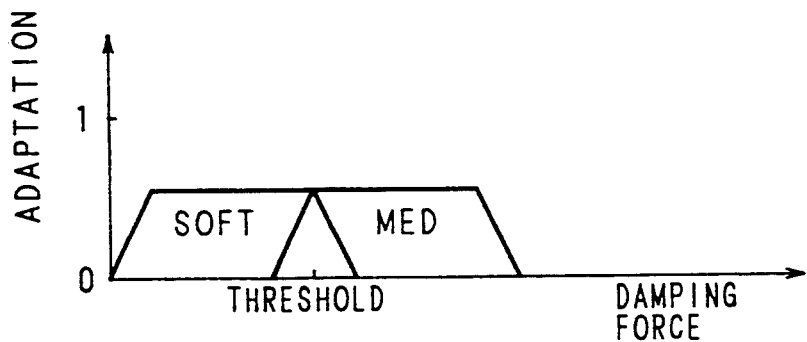
FIG. 5 is a graph showing membership functions regarding the attenuation in the fundamental mode.

Next, the fuzzy inference of the present invention will further be detailed. FIGS. 2, 3, 4 and 5 show the membership functions respectively, in which FIG. 2 shows the membership functions as to the vertical acceleration frequency, FIG. 3 shows a membership function as to amplitude of vertical acceleration, strengths of the roll acceleration and of the longitudinal acceleration, FIG. 4 shows the membership functions of damping force, and FIG. 5 shows the membership functions of the damping force in the fundamental mode, these membership functions being preset at the fuzzy inference unit 8.

Figure 6A:
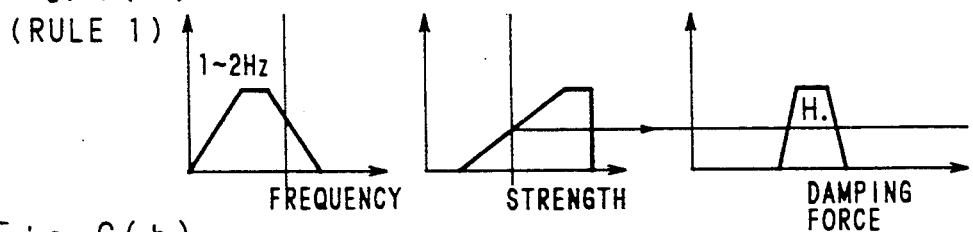
FIGS. 6(a)-6(e) illustrate modes of fuzzy inference in accordance with fuzzy rules.
Figure 6B:
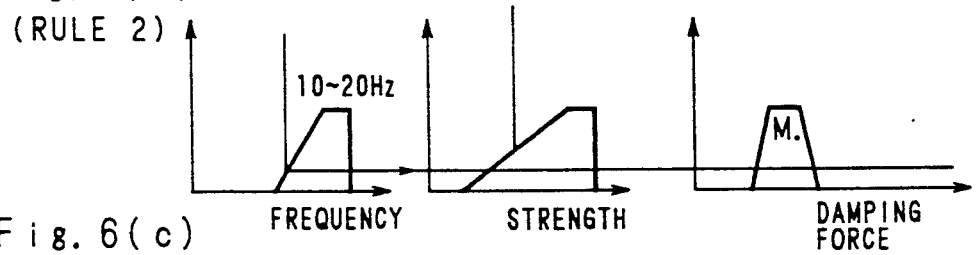
Figure 6C:
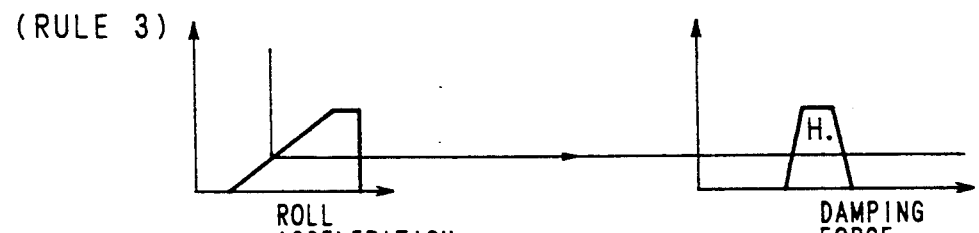
Figure 6D:
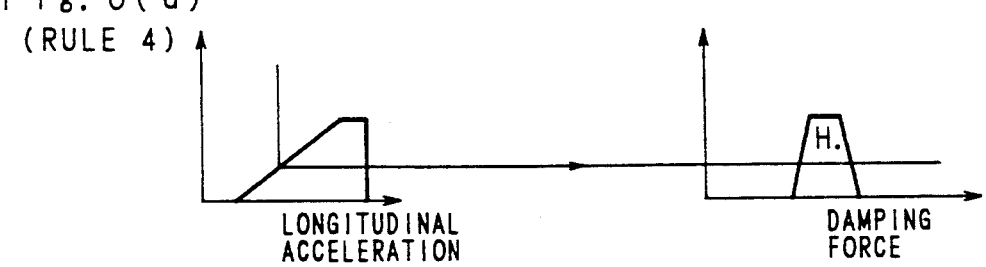
Figure 6E:
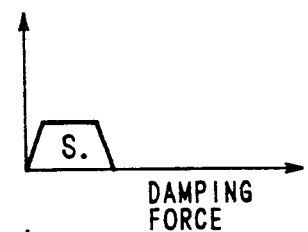
Figure 6F:
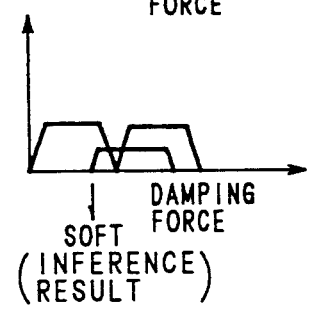
FIG. 6(f) illustrates the results of fuzzy inference.

Also, FIGS. 6(a) through 6(e) show modes of fuzzy inference performed in accordance with the aforesaid fuzzy rules 1 through 5, and FIG. 6(f) shows the result of fuzzy inference. As shown in FIGS. 6(a) through 6(e), the intersection of the input values (fuzzy variable value and fundamental mode specified value) to the fuzzy inference unit 8 with the corresponding membership function is obtained, and in the membership function of damping force selected in accordance with the fuzzy rules 1 through 5, the membership function corresponding to the intersection is cut out, where the membership function of damping force in the rule 5 shown in FIG. 6(e) is not subjected to processing of being cut out by the fuzzy variable except for selecting SOFT or MEDIUM in FIG. 5 by the mode assignment. As seen from FIGS. 6(a) and 6(b), when two or more fuzzy variables are inputted as in the rules 1 and 2, the intersection smaller in adaptation is adapted to cut out the membership function of damping force. Also, as shown in FIG. 6(f), the damping force depends on the center of gravity of logical sum of the cut-out membership function.

A signal for the damping force of HARD, MEDIUM or SOFT decided as above-mentioned is outputted to the damping force control unit 9 and the damping force of shock absorber is controlled corresponding to the signal.

In addition, FIG. 6 shows an example for the fuzzy inference, other various methods of fuzzy inference being considered.

Next, explanation will be given of a modified embodiment of the shock absorber of the invention.

Figure 7:
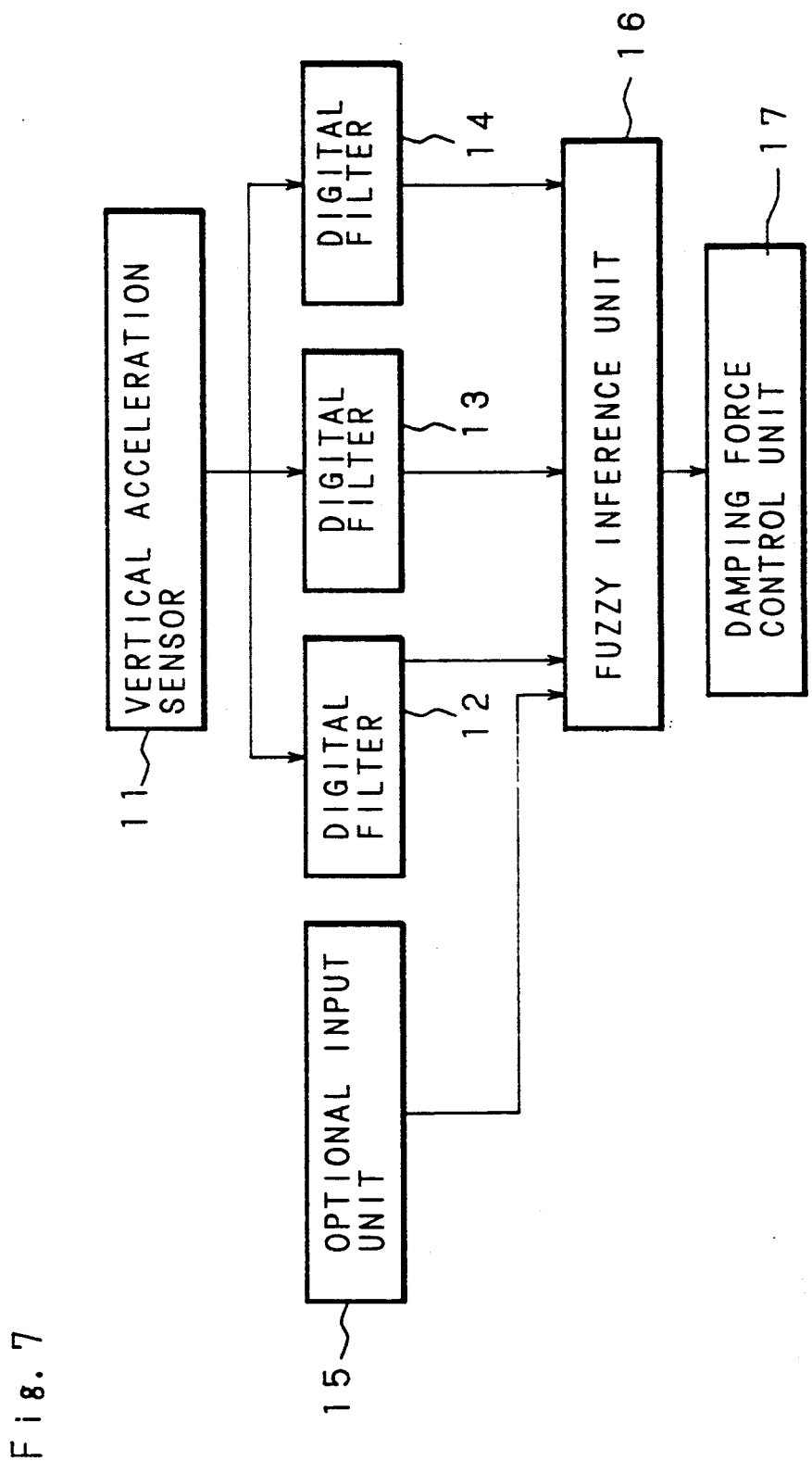
FIG. 7 is a block diagram of a modified embodiment of the shock absorber control apparatus of the present invention.

Referring to FIG. 7, reference numeral 11 designates a vertical acceleration sensor for the vehicle body, which is analogue and detects the vertical acceleration of the vehicle and the signal obtained by the acceleration sensor 11 is outputted to three digital filters 12, 13 and 14. The first digital filter 12 passes only the frequency component of 1 to 2 Hz among the outputs of acceleration sensor 11. The second digital filter 13 passes only the frequency component of about 4 Hz among the same. The third digital filter 14 passes only the frequency component of 10 to 20 Hz among the same. The output signal from each filter 12, 13 or 14 is inputted to a fuzzy inference unit 16. The fuzzy inference unit 16 decides an optimal damping force by the fuzzy inference on the basis of these signals and outputs them to a damping force control unit 17, which controls the damping force of shock absorber corresponding to the output from the fuzzy inference unit 16. Reference numeral 15 designates an optional input unit for inputting therein a user's choice with respect to the damping force of shock absorber. When a desired signal is inputted from the optional input unit 15, the fuzzy inference unit 16 performs the fuzzy inference corresponding to the desired signal.

Figure 8:
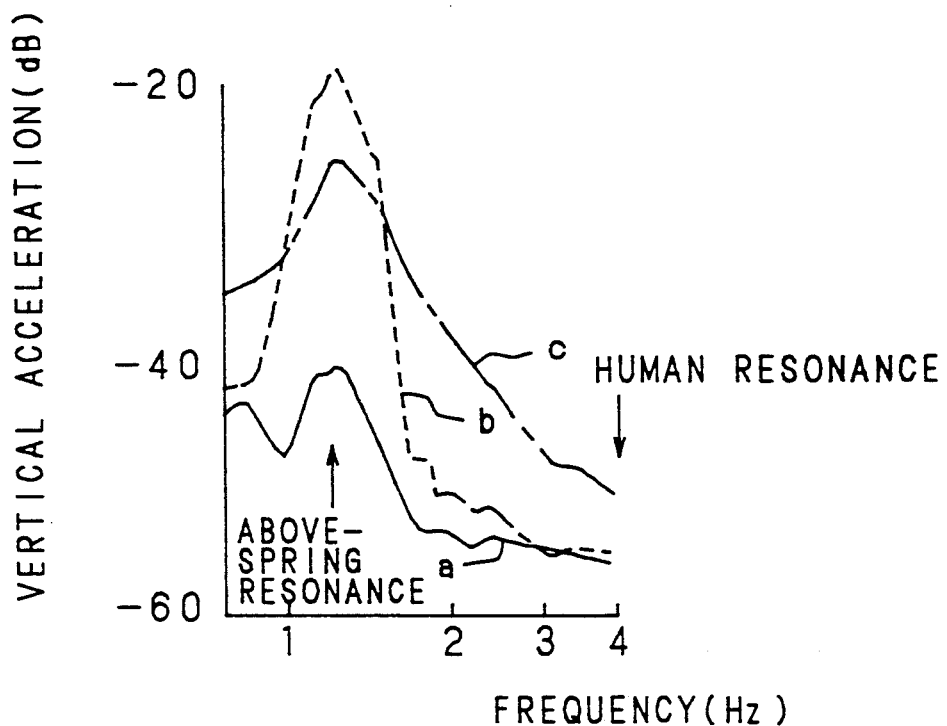
FIG. 8 is a frequency characteristic view of the vertical acceleration of a vehicle body corresponding to the road surface condition.

Next, explanation will be given on operation of the shock absorber control apparatus of the invention. The vertical acceleration of the vehicle body is detected by the acceleration sensor 11. A detection output thereof is different in the frequency characteristic from each other due to the running road surface as shown in FIG. 8, which, when the road surface is good, is the frequency characteristic as shown by a; when undulated, that by b; and when bad, that by c. It is well-known that when in the resonance above spring corresponding to the road surface condition, the component of frequency of 1 to 2 Hz increases, when in the human resonance, that of 4 to 8 Hz increases, and when in the resonance below spring, that of 10 to 20 Hz increases. Accordingly, the frequency passage characteristic of each filter 12, 13 or 14 is set as the above-mentioned, thereby enabling the road surface condition to be decided on the basis of output of each filter 12, 13 or 14, the outputs of filters 12, 13 and 14 and an output of the optional input unit 15 are inputted into the fuzzy inference unit 16, in which an optimal damping force is decided by the fuzzy inference.

Figure 9:
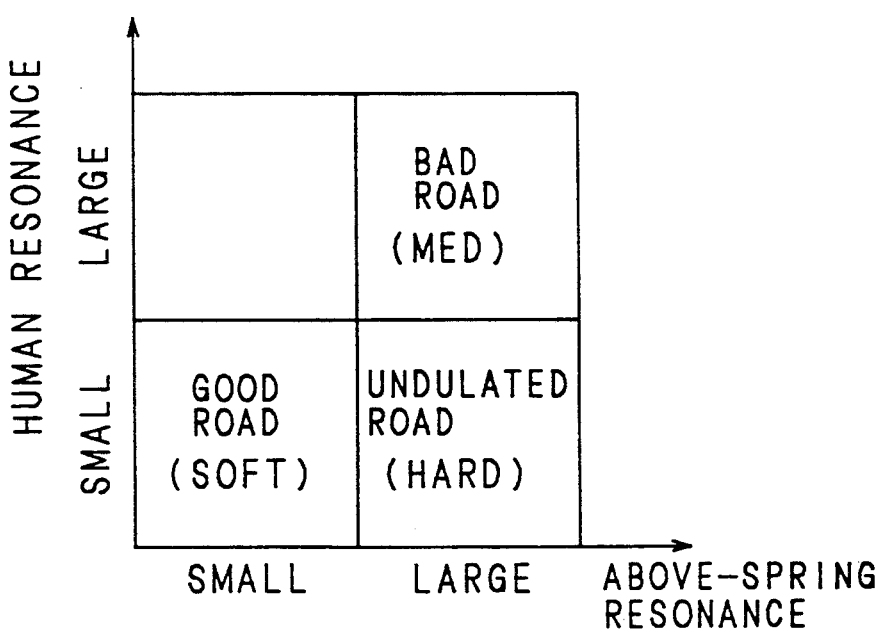
FIG. 9 shows a rule for deciding the road surface condition.
Figure 10:
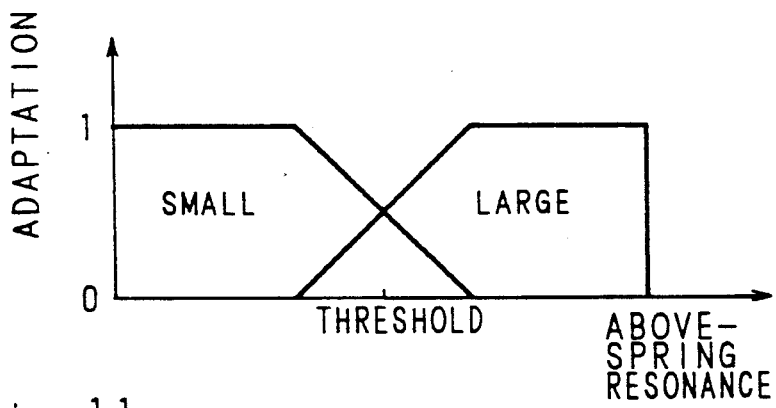
FIG. 10 is a graph of membership functions regarding the resonance above spring.
Figure 11:
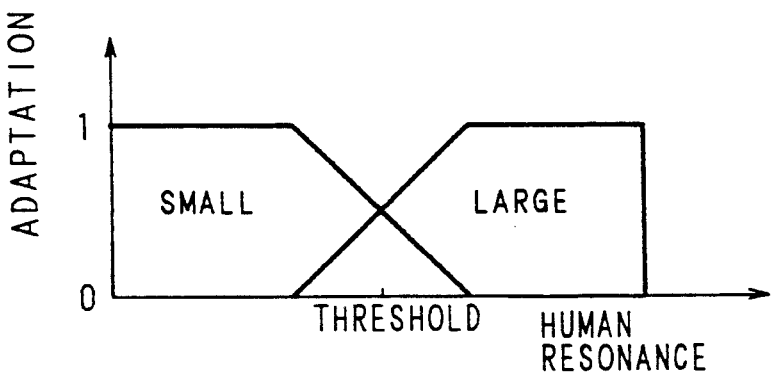
FIG. 11 is a graph of membership functions regarding the human resonance.
Figure 12:
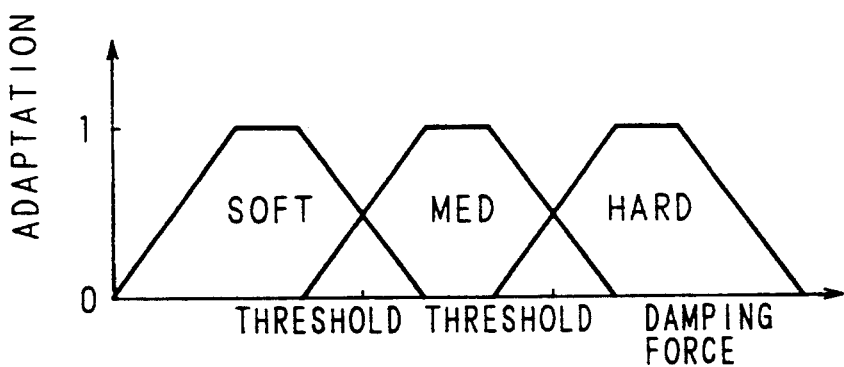
FIG. 12 is a graph of membership functions regarding the damping force.
Figure 13:
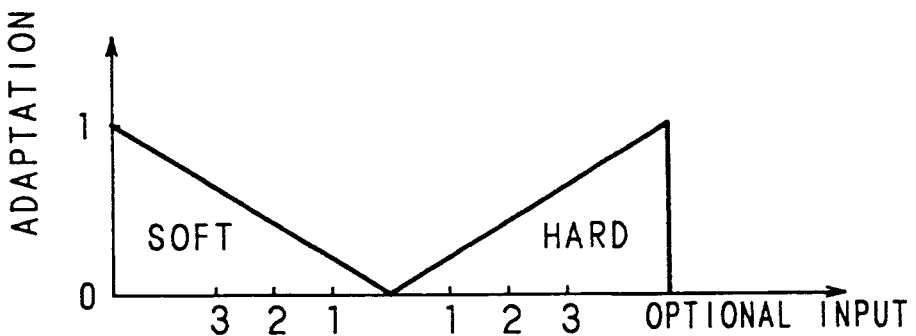
FIG. 13 is a graph of membership functions regarding an input desired by a user.

The fuzzy inference is performed in accordance with the following fuzzy rules: In the rule 1, when the resonance above spring is larger and human resonance is larger, the bad road in FIG. 8(c) is decided to set the damping force MEDIUM. In the rule 2, when the resonance above spring is larger and human resonance is smaller, the undulated road (in FIG. 8(b)) is decided to set the same HARD. In the rule 3, when the resonance above spring is smaller and human resonance is smaller, the good road (in FIG. 8(c)) is decided to set the same SOFT. The rules of such road surface condition can be decided as shown in FIG. 9. In the rule 4, when the user desired HARD, the damping force also is set HARD, and when SOFT, the same is set SOFT. When the road is graveled, the resonance below spring decides it, and when the amplitude of resonance below spring is a threshold value or more and continues for a predetermined time or more, the damping force is stopped at MEDIUM by the not-fuzzy rule.

Next, explanation will be given on the fuzzy inference. The membership functions of the resonance above spring, human resonance, damping force and desired input are shown in FIGS. 10, 11, 12 and 13 respectively, which are previously set in the fuzzy inference unit 16; actual values of the resonance above spring, human resonance, resonance below spring, and option of the user, being inputted from the filters 12, 13 and 14 and optional input unit 15 to the fuzzy inference unit 16. As shown in FIGS. 14(a) to 14(d), the intersection of membership function corresponding to the input value is obtained, so that at the membership function of damping force selected in accordance with the aforesaid fuzzy rule, part of membership function corresponding to the intersection is cut out. As shown in FIG. 14(e), the damping force depends on the center of gravity of the logical sum of the cut-out parts. The signal of damping force of the predetermined HARD, MEDIUM or SOFT is inputted into the damping force control unit 17 in FIG. 7, thereby controlling the damping force of the shock absorber to correspond to the signal.

In addition, FIG. 14 shows an example in the fuzzy inference, and other examples of the fuzzy inference method, for example, added with an output of filter 4, are of course considered.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A shock absorber control apparatus for controlling a damping force of a shock absorber provided at a vehicle, comprising:

detecting means for detecting a running condition of said vehicle, wherein said running condition is detected based upon data derived from a sensor for detecting a steering angle of said vehicle, a sensor for detecting a speed of said vehicle, a sensor for detecting a vertical acceleration of said vehicle, a sensor for detecting whether or not braking operation is carried out for said vehicle, and a sensor for detecting an opening speed of a throttle of said vehicle;

means for estimating a value of a fuzzy variable on the basis of the running condition detected by said detecting means;

fuzzy inference means for performing a fuzzy inference corresponding to a fuzzy rule between a membership function of said fuzzy variable and a membership function using the damping force as the fuzzy variable, thereby deciding the damping force of said shock absorber; and means for controlling the damping force of said shock absorber corresponding to the damping force decided by said fuzzy inference means, said damping force being decided by a center of gravity of a logical sum of said membership functions.

2. A shock absorber control apparatus according to claim 1, wherein said membership function of said fuzzy variable is an antecedent of said fuzzy rule and said membership function using the damping force as the fuzzy variable is a consequent of said fuzzy rule.

3. A shock absorber control apparatus according to claim 1, wherein said detecting means obtains a detected value corresponding to the running condition of said vehicle.

4. A shock absorber control apparatus according to claim 3, further comprising input means for giving an input signal to said fuzzy inference means so that a specified damping force to be set when the detected value obtained by said detecting means is a predetermined value or less is decided by said fuzzy inference means.

5. A shock absorber control apparatus according to claim 4, wherein said input signal from said input means is given to said fuzzy inference means regardless of the detected value obtained by said detecting means.

6. A shock absorber control apparatus according to claim 4, wherein, when the detected value obtained by said detecting means is a predetermined value or less, said fuzzy inference means does not perform the fuzzy inference based on the detected value obtained by said detecting means.

7. A shock absorber control apparatus according to claim 1, wherein said membership function of said fuzzy variable and said membership function using the damping force as the fuzzy variable are previously set in said fuzzy inference means.

8. A shock absorber control apparatus for controlling a damping force of a shock absorber provided between each wheel and a body of a vehicle, comprising:
- an acceleration sensor for detecting a vertical acceleration of said body;
- a plurality of filters for passing different specified frequency components of the output of said acceleration sensor respectively;
- fuzzy inference means for deciding the damping force of said shock absorber by performing a fuzzy inference on the basis of the output of each of said filters; and
- means for controlling the damping force of said shock absorber corresponding to the damping force decided by said fuzzy inference means.

9. A shock absorber control apparatus according to claim 8, wherein said plurality of filters comprises a first filter for passing a frequency component corresponding to the resonance state above spring, a second filter for passing a frequency component corresponding to the human resonance state, and a third filter for passing a frequency component corresponding to the resonance state below spring.

10. A shock absorber control apparatus according to claim 9, wherein said first filter passes a frequency band of 1 to 2 Hz of the output of said acceleration sensor.

11. A shock absorber control apparatus according to claim 9, wherein said second filter passes a frequency band of about 4 Hz of the output of said acceleration sensor.

12. A shock absorber control apparatus according to claim 9, wherein said third filter passes a frequency band of 10 to 20 Hz of the output of said acceleration sensor.

13. A shock absorber control apparatus according to claim 8, wherein said acceleration sensor is analog type.

14. A shock absorber control apparatus according to claim 8, wherein each of said filters is digital type.

15. A shock absorber control apparatus according to claim 8, further comprising selection means for giving a selecting signal to said fuzzy inference means so that the damping force desired by a driver for said vehicle is decided by said fuzzy inference means.

16. A shock absorber control apparatus according to claim 15, wherein said fuzzy inference means decides the damping force by performing the fuzzy inference on the basis of the output of each of said filters and said selecting signal.

* * * * *